United States Patent
Laugier et al.

(10) Patent No.: US 7,882,105 B2
(45) Date of Patent: Feb. 1, 2011

(54) METHOD OF RANKING A SET OF ELECTRONIC DOCUMENTS OF THE TYPE POSSIBLY CONTAINING HYPERTEXT LINKS TO OTHER ELECTRONIC DOCUMENTS

(75) Inventors: Alexandre Laugier, Peille (FR); Stephanie Raymond, Antibes (FR)

(73) Assignee: France Telecom, Paris (FR)

(*) Notice: Subject to any disclaimer, the term of this patent is extended or adjusted under 35 U.S.C. 154(b) by 386 days.

(21) Appl. No.: 11/492,458

(22) Filed: Jul. 24, 2006

(65) Prior Publication Data

US 2007/0033206 A1  Feb. 8, 2007

(30) Foreign Application Priority Data

Jul. 22, 2005 (FR) .................................. 05 52278

(51) Int. Cl.
*G06F 7/00* (2006.01)
*G06F 17/30* (2006.01)

(52) U.S. Cl. ........................................ 707/726; 707/729
(58) Field of Classification Search ........................ None
See application file for complete search history.

(56) References Cited

U.S. PATENT DOCUMENTS

| | | | | |
|---|---|---|---|---|
| 5,848,407 A | * | 12/1998 | Ishikawa et al. | 707/2 |
| 6,112,202 A | * | 8/2000 | Kleinberg | 707/5 |
| 6,112,203 A | * | 8/2000 | Bharat et al. | 707/5 |
| 6,665,837 B1 | * | 12/2003 | Dean et al. | 715/234 |
| 6,704,738 B1 | * | 3/2004 | de Vries et al. | 1/1 |

(Continued)

OTHER PUBLICATIONS

Hu, Xiaohua, et al., "Discovering cyber communities from the WWW", Proceedings of the 27th Annual Int'l. Computer Software and Applications Conference, Dallas, TX, vol. CONF. 26, pp. 597-601, Nov. 3, 2003.

(Continued)

*Primary Examiner*—Pierre M Vital
*Assistant Examiner*—Augustine Obisesan
(74) *Attorney, Agent, or Firm*—David D. Brush; Westman, Champlin & Kelly, P.A.

(57) ABSTRACT

A method which makes it possible to select a predefined maximum number N of documents from a set of electronic documents. A graph G is constructed on the basis of the set of electronic documents, each vertex of the graph G corresponding to one of the documents of said set and each edge between two vertices of the graph indicating the presence of at least one hypertext link between the two documents, corresponding to the two vertices considered. The method uses the topological properties of this graph to select a subset of N documents. A minor $M_G$ of the graph G is generated comprising a predefined maximum number N of vertices by deletion of at least one vertex of the graph G, this deletion being aimed at minimizing for the predefined number N of vertices a predefined distance between the graph G and the minor $M_G$, this distance measuring the perturbation of the neighborhood of the vertices of the graph G that is engendered by the generation of the minor $M_G$.

13 Claims, 3 Drawing Sheets

U.S. PATENT DOCUMENTS

| | | | | |
|---|---|---|---|---|
| 6,738,678 B1 * | 5/2004 | Bharat et al. | ............... | 700/48 |
| 6,788,316 B1 * | 9/2004 | Ma et al. | ............... | 715/760 |
| 6,792,419 B1 * | 9/2004 | Raghavan | ............... | 707/3 |
| 7,346,604 B1 * | 3/2008 | Bharat et al. | ............... | 707/3 |
| 2003/0050909 A1 * | 3/2003 | Preda et al. | ............... | 707/1 |
| 2005/0033742 A1 * | 2/2005 | Kamvar et al. | ............... | 707/7 |
| 2005/0086260 A1 * | 4/2005 | Canright et al. | ............... | 707/104.1 |
| 2005/0278325 A1 * | 12/2005 | Mihalcea et al. | ............... | 707/6 |
| 2006/0059119 A1 * | 3/2006 | Canright et al. | ............... | 707/3 |

OTHER PUBLICATIONS

Kumar, R., et al. "Trawling the Web for emerging cyber-communities", Computer Networks, Elsevier Science Publishers B.V., Amsterdam, NL, vol. 31, No. 11-16, May 17, 1999, pp. 1481-1493.

Krishnamurthy, V., et al., "Reducing large Internet topologies for faster simulations", Networking Technologies, Services, and Protocols; Performance of Computer and Communication Networks; Mobile and Wireless Communication Systems, May 6, 2005, pp. 328-341.

* cited by examiner

METHOD OF RANKING A SET OF ELECTRONIC DOCUMENTS OF THE TYPE POSSIBLY CONTAINING HYPERTEXT LINKS TO OTHER ELECTRONIC DOCUMENTS

FIELD OF THE INVENTION

The invention concerns the fields of telecommunications and in particular the field of search engines for searching for electronic documents.

More precisely the invention relates to a method of computerized sorting of a set of electronic documents of the type possibly containing hypertext links to other electronic documents. Such a set results for example from a search performed by a user by means of a search engine on an Internet type network, the electronic documents being in this case web pages (the abbreviation for "World Wide Web") accessible locally via a local storage medium or remotely via the network.

BACKGROUND OF THE INVENTION

Search engines use several techniques for sorting or sorting pages arising from a search. Among the known techniques for exploring a set of web pages, some rely on semantics, a page being ranked as being all the more relevant if it comprises a large number of occurrences of the word or words searched for. These techniques are sensitive to a practice, known as "spamming", aimed at causing the words commonly used by surfers in their search query to appear a very large number of times in a given page, this having the effect of causing the page to appear frequently to be relevant.

Other techniques are based on the topological structure of the web. These techniques take account at one and the same time of the existing links between the pages considered and properties of the pages themselves, such as whether a page belongs to a domain or to a network subdomain of the web. These techniques are generally based on a graph representation of the pages to be processed. They are appropriate to the classification of pages complying with given topological properties in the graph. These techniques are sensitive to a variant of the practice of "spamming" aimed at referencing a given page a large number of times, this having the effect of locally falsifying the topological characteristics of the graph of the web.

Some of the techniques utilizing the topological structure of the web consist in effecting a classification of the web pages by allocating to the various pages a rank which is dependent on the relations of one page with the others.

An example of such a procedure, known by the term "PageRank", is used in the implementation of the Google™ search engine and is described in the document: "*The PageRank Citation Ranking: Bringing Order on the Web*", by L. Page, S. Brin, R. Motwani and T. Winograd; Technical Report, Computer Science Department, Stanford University, 1998.

The *PageRank* procedure orders the pages as a function of their visibility on the web. In this procedure, random navigation from page to page around the web following the hypertext links is simulated. This navigation corresponds to that operated by a user accessing the web when the latter randomly activates one of the hypertext links located in a displayed page, so as to access another page. This procedure carries out a probabilistic analysis of this simulated navigation so as to determine the probability of the user being located in a given page during random navigation from page to page such as this. The rank of a page is all the higher the higher the number of times this page is cited by other pages.

Such a procedure provides a ranking which is not necessarily relevant as regards the search performed by a user, the best ranked pages (of highest rank) not necessarily being the pages corresponding best to the user's expectation.

Furthermore, this procedure does not make it possible to identify in the set of documents thematic communities or communities of interest, apt to steer the user more rapidly to an interesting page, nor even to perform a classification of the documents found by thematic community.

SUMMARY OF THE INVENTION

One object of the invention is to solve the abovementioned drawbacks of the prior art by providing a technique for sorting electronic documents, for example web pages, which makes it possible, to circumvent the problems related to spamming, which is applicable to a large set of documents while being rapid in its implementation, and which makes it possible to obtain a classification of the documents, not by allocation of rank, but by construction of communities, in particular of thematic communities, within the initial set of documents.

This and other objects are attained in accordance with one aspect of the present invention directed to a method of computerized sorting of a set of electronic documents of the type possibly containing hypertext links to other electronic documents. The set of documents is analyzed so as to detect the presence of hypertext links and to construct a graph G representing this set of documents, each vertex of the graph corresponding to one of the documents of the set, the presence of an edge between two vertices of the graph indicating the presence of at least one hypertext link between the two documents corresponding to two vertices. A minor $M_G$ of the graph G is obtained which comprises a predefined maximum number N of vertices by deletion of at least one vertex of the graph G, this deletion being aimed at minimizing for the predefined number N of vertices a predefined distance between the graph G and the minor $M_G$, this distance measuring the perturbation of the neighborhood of the vertices of the graph G that is engendered by the generation of the minor $M_G$. The subset of the set of documents is determined, which corresponds to the vertices of the minor $M_G$ obtained.

The implementation of a method according to the invention thus allows the determination of communities of documents solely on the basis of links existing between these documents and not on the basis of their semantic content. In this way, it is in particular possible to circumvent the spamming problems related to the taking into account of semantics in the search for documents.

Furthermore, the minor is determined in such a way as to minimize the perturbation engendered on the starting graph by the minor generation procedure. In this sense, the document subset obtained, corresponding to the vertices of the minor determined, is that which, for a given size of minor, is the most representative—the closest in the sense of the distance chosen—of the starting document set.

Additionally, the method according to the invention offers the advantage, when it is applied to the pages found by means of a web page search engine, of presenting the user with a result comprising at least one subset of pages or one community of pages. Therefore, such a method permits a sorting of the set of documents into communities of interest or thematic communities, these communities being representative of the set of pages found in response to a search query. On the basis of the communities of pages extracted, a user is able to rapidly and simply identify the pages which are of most interest to him.

On account of the fact that a minor is determined which minimizes the perturbation engendered by the minor generation procedure, the method according to the invention tends to preserve any set of vertices pointing essentially to one another and tends to delete the isolated vertices in the graph. Specifically, the deletion of isolated vertices engenders a weak perturbation whereas this is not the case for a vertex comprising a significant number of links to other vertices.

As a consequence, the method according to the invention makes it possible to determine for a set of documents at least one community, this community being characterized by the fact that the documents of which it is composed point essentially to the other documents of the community. It may be remarked that when a community exhibits such a characteristic, it is usually a thematic community. The invention advantageously exploits this remark for the construction of the communities.

The method according to the invention finally makes it possible to fix a maximum size for the subsets searched for, this signifying that the number of pages constituting the response to an interrogation of the web may be curbed.

Moreover, if the procedure is now applied to a graph of domains (or graph of domain home pages) instead of to any graph of web pages, it is possible to rank the domains as a function of their hosting site. Specifically, the presence of a hosting site is manifested through the presence of links from this site to the home pages of the domains and the minor search procedure preserves such structures of links.

According to one embodiment of the invention, the step of obtaining a minor $M_G$ of the graph G includes a step of processing the graph G by an iterative process, each iteration consisting in generating a minor $M_{i+1}$ of the current minor $M_i$ by deletion from the current minor $M_i$ of at least one vertex v satisfying a predefined criterion relating to the comparison of its neighborhood in the current minor $M_i$ and of its neighborhood in the starting graph G, the iterative process ending when the number of vertices of the current minor $M_i$ becomes less than or equal to N.

By virtue of an iterative process such as this operating solely on the neighborhood of the vertices of the graph, and progressively reducing the number of vertices in the current graph, it is thus possible to curb in a simple manner the number of vertices retained in the final minor.

According to a preferred embodiment of the invention, said criterion is satisfied for a given vertex v if the characteristic vector $A_{M_i}(v)$ of the neighborhood of the vertex v in the current minor $M_i$ and the characteristic vector $A_G(v)$ of the neighborhood of the vertex v in the starting graph G, satisfy the following relation:

$$|A_{M_i}(v)| \leq \beta |A_G(v) - A_{M_i}(v)|$$

where $\beta$ is a convergence parameter.

This selecting of the vertices to be preserved, performed with the aid of such a criterion, is simple to implement and the speed of convergence of the iterative process is thus controlled by means of a single convergence parameter $\beta$.

According to one embodiment of the invention, said iterative process is applied to the graph G after execution of a step consisting in deleting from said graph G the vertices having a number of neighbors that is less than a predefined threshold $\alpha$.

This prior step thus makes it possible to reduce the starting graph G to an initial minor allowing the fastest possible convergence to a minor such that the predefined distance between the graph G and the minor $M_G$ is as small as possible.

According to a preferred embodiment the invention furthermore comprises the steps of:

processing the graph G by a second iterative process, each iteration consisting in generating a graph $G_{i+1}$ on the basis of the current graph $G_i$, by deletion from the current graph $G_i$ of any vertex which belongs to the minor $M_{G_i}$, obtained by application of step b) to the graph $G_i$, and which satisfies a second predefined criterion pertaining to its neighborhood in this minor $M_i$, this second iterative process ending when the current graph $G_i$ is empty; and determining, for each minor $M_{G_i}$ obtained, the subset of said set of documents corresponding to the vertices of this minor.

In this way, one obtains a classification of all the documents of the starting set into subsets whose union is equal to the starting set. In such a classification, each document belongs to at least one subset which corresponds on each occasion to a minor $M_{G_i}$.

Advantageously, the method according to an embodiment of the invention furthermore comprises the steps of determining for each vertex the number of minors $M_{G_i}$ to which it belongs, and performing a ranking of said set of documents, the rank of a document being determined as a function of the number of obtained minors comprising the vertex corresponding to said document.

Thus, in addition to a possibility of classifying the set of documents into subsets, there is a possibility of ranking the documents by means of a rank, the number of minors that was determined for the vertex corresponding to a document, constituting the rank of the document.

The method of sorting according to the invention advantageously makes it possible to circumvent the problems of "spamming" by multiplication of the links to a given document, since a document referenced several times will usually belong to just one minor.

According to another aspect of the invention, an information medium is provided including a computer program, said program comprising instructions suited to the implementation of the steps of a method according to embodiments of the invention briefly described above, when this program is executed on a computer.

According to another aspect of the invention, a computing device is provided for the sorting of a set of electronic documents of the type possibly containing hypertext links to other electronic documents. A means is provided for analyzing the set of documents so as to detect the presence of hypertext links and to construct a graph G representing said set of documents, each vertex of the graph corresponding to one of the documents of said set, the presence of an edge between two vertices of the graph indicating the presence of at least one hypertext link between the two documents corresponding to said two vertices. A means is provided for obtaining a minor $M_G$ of the graph G comprising a predefined maximum number N of vertices by deletion of at least one vertex of the graph G, said deletion being aimed at minimizing for said predefined number N of vertices a predefined distance between said graph G and said minor $M_G$, said distance measuring the perturbation of the neighborhood of the vertices of the graph G that is engendered by the generation of the minor $M_G$. A means is also provided for determining the subset of said set of documents, which corresponds to the vertices of the minor $M_G$ obtained.

According to one embodiment of the device according to the invention, the device comprises means for the implementation of a method according to the invention.

DETAILED DESCRIPTION OF THE DRAWINGS

The different mathematical notation relating to graph theory and necessary for the understanding of the invention is recalled briefly hereinbelow.

We denote by G=(V,E) a graph where V denotes the set of vertices and E denotes the set of edges between vertices.

A minor $M_G=(V',E')$ of a graph G=(V,E) is any subgraph induced which may be obtained from the graph G either by deleting a vertex and the edges which are incident thereat, or by contracting one of the edges of the graph G, the operations of deleting vertices or of contracting an edge being iteratively repeatable.

The adjacency matrix $A_G$ of a graph G is defined as being a square matrix whose rows and columns are indexed by the vertices of the graph. An element $A_G(i,j)$ of the adjacency matrix equals 1 if vertex i is connected to vertex j by at least one edge (in this case i is said to neighbor j) and equals 0 in the converse case. In the case where the graph G considered is not oriented, the adjacency matrix $A_G$ is symmetric.

The construction of a minor $M_G$ of G by vertex deletion corresponds to the deletion of a column of the adjacency matrix $A_G$ as well as the row of like index, this operation of deletion being iteratively repeatable to obtain a minor of fixed size.

As a variant, it is possible to determine for the minor $M_G$ an adjacency matrix $A_{M_G}$ of the same dimensions as the matrix $A_G$ by zeroing rows and columns of the matrix $A_G$ which correspond to the deleted vertices.

A row of the adjacency matrix $A_G$ is the characteristic vector $A_G(u)$ of the neighborhood in the graph G of the vertex u through which this row is indexed. The number of neighbors of a vertex u is determined for example by mean of the adjacency matrix $A_G$, by computing the number of 1 in the characteristic vector $A_G(u)$ of the neighborhood of the vertex u.

The Hamming distance of two vectors is the number of coordinates by which they differ. The Hamming distance $H(u_1,u_2)$ between two characteristic vectors of the neighborhood in the graph G=(V,E) of two vertices $u_1$ and $u_2$ belonging to V can thus be defined by the following relation:

$$H(u_1, u_2) = |A_G(u_1) - A_G(u_2)| = \sum_{v \in V} |A_G(u_1, v) - A_G(u_2, v)|.$$

The diameter of a graph is the value in terms of number of edges of the longest of the shortest paths joining the pairs of vertices of this graph.

The principles underlying the method according to the invention will now be presented. The invention proposes a procedure for sorting a set of documents or pages by determining minors corresponding to communities of documents or subsets of the set of starting documents.

In the procedure proposed, the starting document set is represented in the form of a non-oriented graph, each vertex of the graph corresponding to one of the documents, each edge between two vertices corresponding to the presence of at least one link of hypertext type between the two documents corresponding to the two vertices considered.

In the example considered here, the graph representing the set of documents is a non-oriented graph. In such a representation, as much importance is attached to a page which points to many pages as to a page which is pointed at by numerous pages. A page which points to numerous pages makes it possible to access these various pages, and it is therefore interesting in this regard.

The invention relies on the fact that the members of a thematic community of the web have pages which point essentially to the pages of the other members of the community. This fact induces certain topological properties of the graph G consisting, on the one hand, of the pages as far as the vertices are concerned, and on the other hand, of the links between pages as far as the edges are concerned.

In particular, it may be stated that the neighborhood of the vertices representing the pages of a community consists essentially of vertices situated inside the community. This observation leads to searching for minors of the graph of the web that are such that the neighborhood of the vertices constituting these minors is perturbed the least possible by the operations making it possible to form these minors.

In order to measure the perturbation of the neighborhood of the vertices of the graph G=(V,E) that is engendered by the generation of a minor $M_G=(V',E')$ of G, we define a distance between said graph G and said minor $M_G$.

This distance is for example the sum of the Hamming distances of the characteristic vectors of the neighborhood of the vertices in the graph G=(V,E) and in a minor $M_G=(V',E')$. This distance makes it possible to measure the perturbation of the neighborhood of this vertex by the operations of construction of the minor. It is denoted $H(G,M_G)$ and is defined by the following relation:

$$H(G, M_G) = \sum_{u \in V'} |A_G(u) - A_{M_G}(u)| = \sum_{u \in V'} \sum_{v \in V} |A_G(u, v) - A_{M_G}(u, v)|$$

where $A_{M_G}$ is the adjacency matrix of the minor $M_G=(V',E')$ of the same dimension as the adjacency matrix $A_G$ of G.

The method according to the invention therefore consists in determining on the basis of the starting graph G=(V,E) the minor $M_G$ of given order N (comprising N vertices) such that the distance $H(G,M_G)$ is a minimum.

It is possible to prove that the calculation time required for the determination of the minor $M_G$ for which the minimum of the function is attained grows exponentially with the size of the starting graph G. Given the large size of the graphs representing the web or a subset of the web, the direct and exact determination of the minimum of the function is not conceivable. One therefore uses a heuristic to best approximate this minimum.

This heuristic consists in performing the search for the minimum, not over the entire graph G, but over a minor of the graph G (the so-called initial minor denoted $M_0$), and in choosing this initial minor $M_0$ in such a way that it is favorable to the determination of a final minor $M_G$ minimizing the distance $H(G,M_G)$.

It may be remarked that, if a vertex u of the graph G=(V,E) is off-centered with respect to the others, that is to say if the paths connecting it to the other vertices are fairly long, then it is the neighbor of only a small number of vertices out of those of V−{u} (set of vertices V minus the vertex u).

So the deletion of the vertex u of the graph G perturbs the neighborhood of only a small number of vertices. The initial minor $M_0$ obtained by its deletion of such a vertex is therefore a good minor from the point of view of the minimization of the distance $H(G,M_G)$.

It may be noted that the pairs of vertices for which the diameter of the graph is attained are pairs of off-centered vertices. One searches for such vertices by employing the Floyd-Warshall algorithm. The $p^{th}$ iteration (p an integer) of this algorithm gives the set of shortest paths comprising at most p edges.

In order to delete several vertices simultaneously, one searches for all the vertices which are connected to a small number of vertices after p iterations of the Floyd-Warshall algorithm. Preferably, p is close to half the diameter of the graph G. This amounts to deleting the vertices of the graph G having a small number of "1" in the corresponding row of the adjacency matrix $A_G$. As a consequence, the initial minor $M_0$ is obtained by deletion from the graph G of the vertices having a number of neighbors $|A_G(v)|$ that is less than a predefined threshold α.

Figure 1:
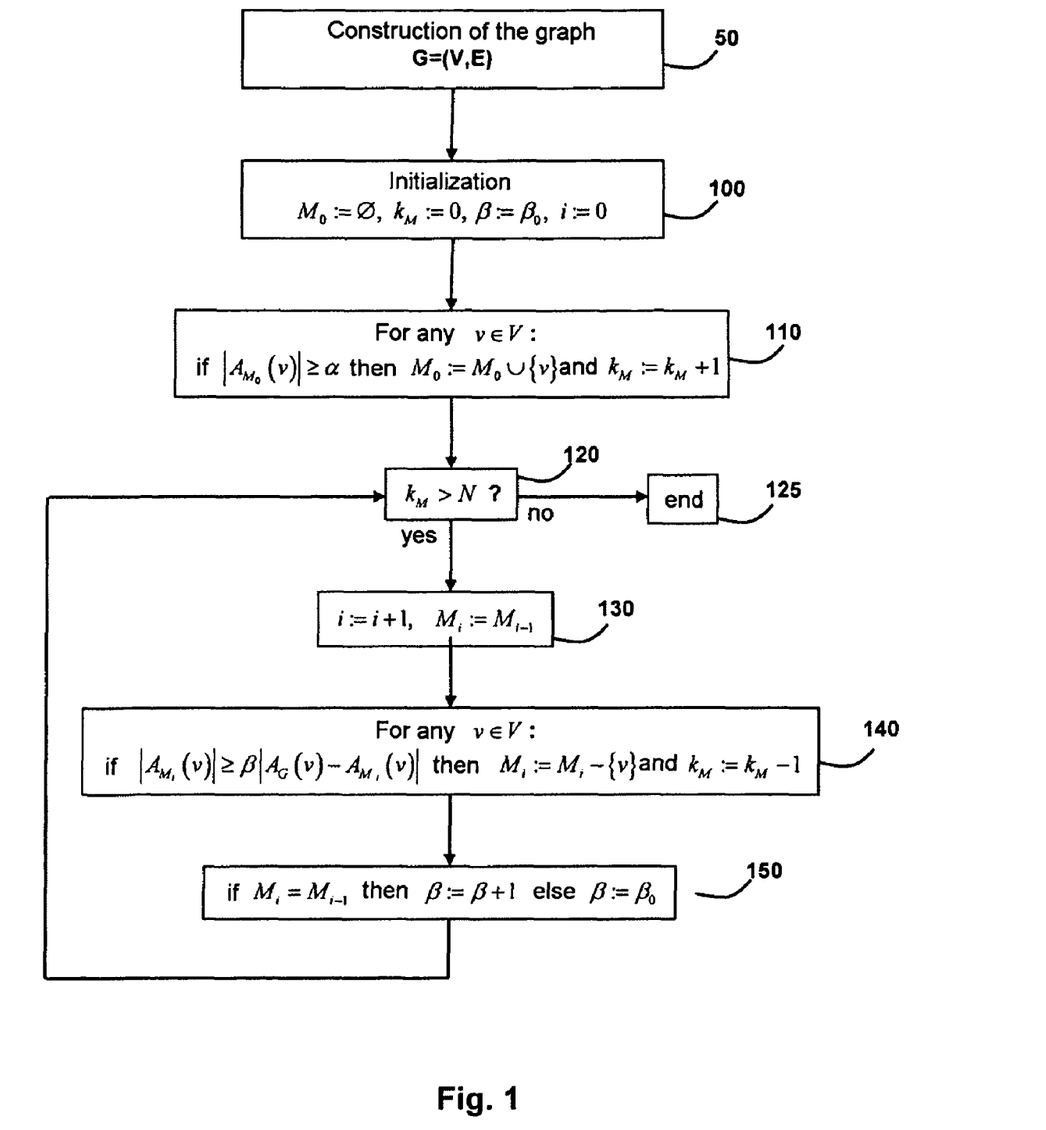
FIG. 1 is a flowchart of the part of the method according to the invention corresponding to the minor generation procedure.

The various steps of the minor generation procedure according to the invention are now described with reference to FIG. 1.

Step 50 consists in constructing a graph G representing the document set for which one wishes to determine subsets of documents. In this graph each vertex of the graph corresponds to one of the documents of the set of documents, the presence of an edge between two vertices of the graph indicating the presence of at least one hypertext link between the two documents corresponding to the two vertices considered.

Step 100 consists in initializing the various parameters used in the processing of the graph G.

Step 110 consists in deleting from said graph G the vertices having a number of neighbors $|A_G(v)|$ that is less than a predefined threshold a. One thus obtains the initial minor $M_0$. The initial minor therefore consists of the vertices having a number of neighbors $|A_G(v)|$ that is greater than the threshold α.

Preferably, the value of the threshold α is adjusted as a function of the diameter of the starting graph G. It is for example chosen equal to half the diameter of the graph G.

The subsequent steps 120 to 150 correspond to an iterative process applied to the initial minor $M_0$.

Each iteration consists in generating a minor $M_{i+1}$ of the current minor $M_i$ by deletion from the current minor $M_i$ of at least one vertex v complying with a predefined criterion comparing its neighborhood in the current minor $M_i$ and its neighborhood in the starting graph G. This iterative process ends when the number $k_M$ of vertices of the current minor $M_i$ becomes less than or equal to N.

Step 120 consists in determining whether the current minor $M_i$ possesses a number $k_M$ of vertices that is less than or equal to N. If it does, the iterative process terminates at step 125. If it does not, the subsequent steps 130 to 150 are executed, consisting in generating a minor $M_{i+1}$ on the basis of the current minor $M_i$.

Step 130 consists in incrementing the index i of the current minor, the current minor being that generated in the previous step 120.

Step 140 consists in deleting from the current minor $M_i$ any vertex v such that the characteristic vector $A_{M_i}(v)$ of the neighborhood of the vertex v in the current minor $M_i$ and the characteristic vector $A_G(v)$ of the neighborhood of the vertex v in the starting graph G satisfies the following relation:

$$|A_{M_i}(v)| \leq \beta |A_G(v) - A_{M_i}(v)| \quad (1)$$

where β is a convergence parameter.

The value of the convergence parameter β is adjusted to a predefined initial value $\beta_0$ before the execution of the iterative process. This initialization is performed for example during the execution of step 100. The initial value $\beta_0$ is for example chosen equal to 1.

On this value of the convergence parameter β will depend the speed with which the minor generation procedure terminates. Specifically, the more the value of the convergence parameter β increases, the more numerous will be the vertices v satisfying relation (1), the faster will be the convergence of the minor generation procedure, but the better will be the approximation obtained in the search for the minimum.

Conversely if the value of β decreases, the convergence is slowed and may even be stopped if no vertex satisfies relation (1). A balance has therefore to be found for the adjustment of this parameter. Advantageously, the value of this parameter is readjusted in the course of the minor generation procedure.

Thus, step 150 consists in adjusting the value of the convergence parameter β. This value is readjusted after an iteration if this iteration has not culminated in the modification of the current minor $M_i$ and if the predefined number N of vertices is not reached for the current minor $M_i$. This readjustment consists for example in incrementing by 1 the value of the convergence parameter β. The value of the convergence parameter β is reinitialized to its initial value $\beta_0$ after an iteration if this iteration has culminated in the modification of the current minor $M_i$.

Figure 2A:
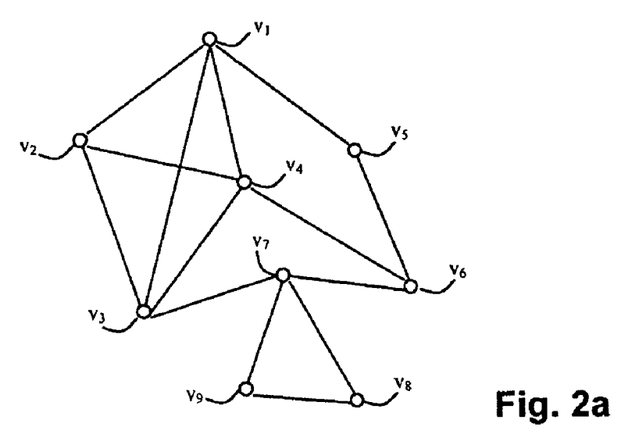
FIGS. 2a to 2d are examples of minors obtained by the minor generation procedure.
Figure 2B:
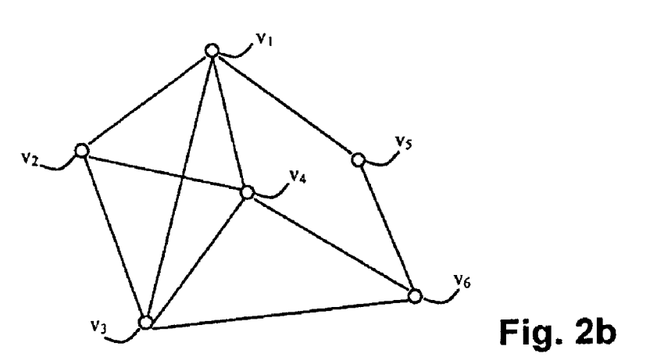
Figure 2C:
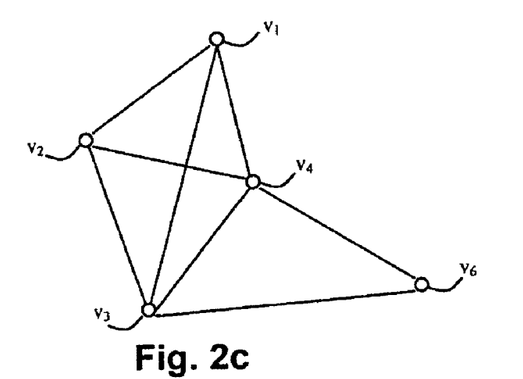
Figure 2D:
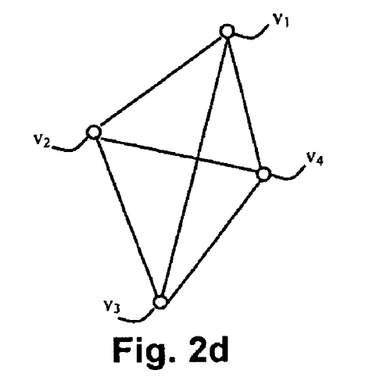

FIGS. 2a to 2d represent examples of graphs. These graphs correspond respectively:

FIG. 2a: to an exemplary starting graph G;

FIG. 2b: to the initial minor $M_0$ obtained on the basis of the graph G of FIG. 2a by application of step 110;

FIG. 2c: to the next minor $M_1$ obtained on the basis of the initial minor $M_0$ of FIG. 2b by application of an iteration 120 to 150;

FIG. 2d: to the final minor $M_G = M_2$ obtained on the basis of the minor $M_1$ of FIG. 2c by application of a new iteration 120 to 150.

It may be remarked with regard to FIG. 2d that the vertices v1, v2, v3 and v4 of the starting graph G of FIG. 2a have been retained in the final minor. This set of vertices corresponds to a subset of vertices that are strongly inter-related in the starting graph of FIG. 2a. They constitute a community in the set of vertices of the graph G. In such a community, the vertices point at one another. Such a structure of edges in a graph representing documents generally manifests the presence of a thematic link or content link between the documents associated with these vertices. The minor generation procedure preserves such a structure.

The minor generation procedure just described is a heuristic making it possible to best approximate, and with a reasonable calculation time despite the size of the graphs to be processed, the minimum of the Hamming distance. The method according to the invention allows a judicious balance between the quality of the approximation obtained and the calculation time or power required.

This minor generation procedure uses the Hamming distance defined above. However, another distance may be used for the implementation of the invention. For example, it is possible to measure the distance between two graphs by the sum of the difference of the eigenvalues of the Laplacians of these graphs. This criterion defined by relation (1) above and used for the selection of the vertices to be deleted, is preferably adapted on each occasion to the distance chosen.

In order to identify the various communities present in the graph of the web considered, the minor generation procedure just described may be applied iteratively, in such a way that, ultimately, any vertex belonging to the graph G also belongs to at least one minor.

Figure 3:
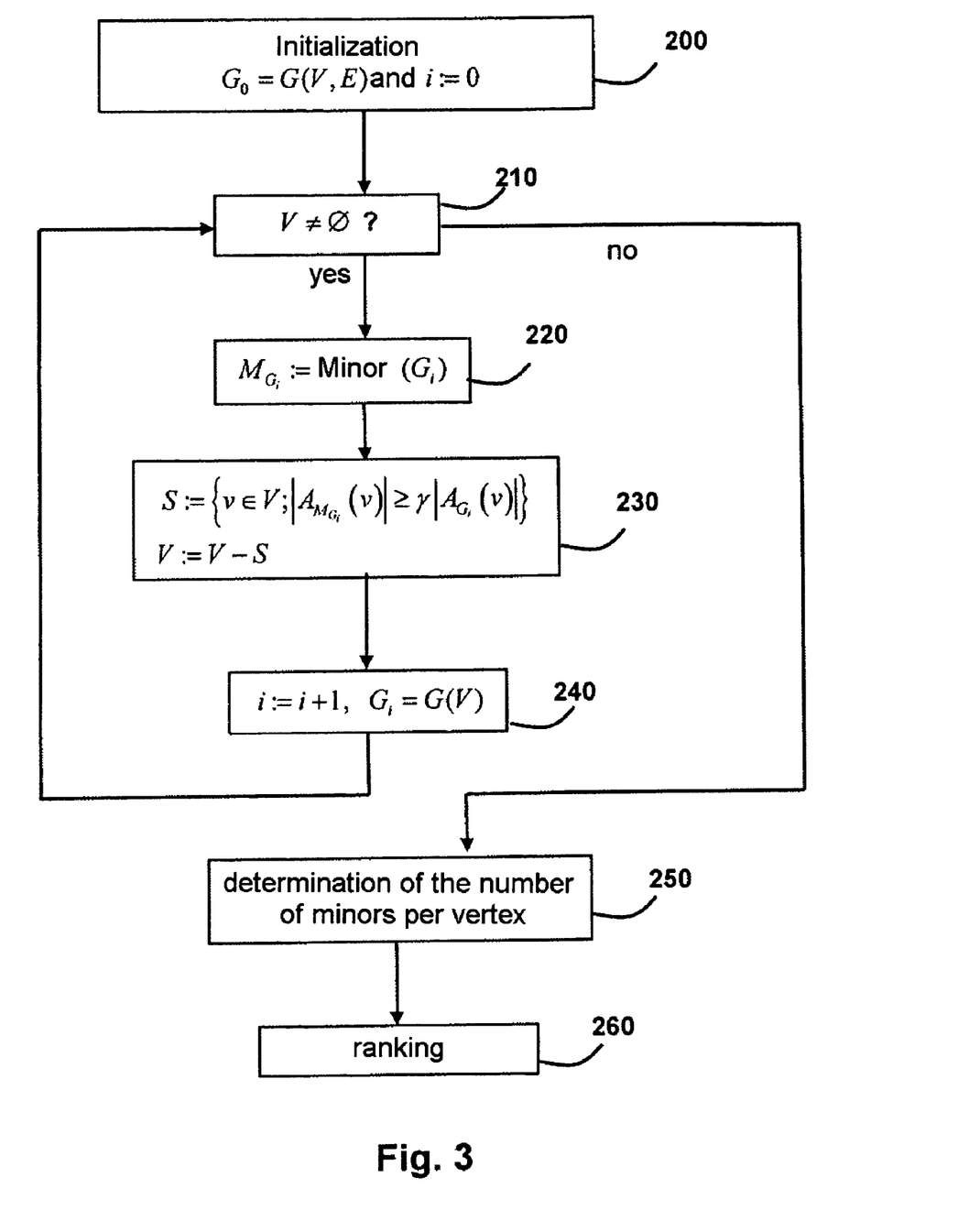
FIG. 3 is a flowchart of an embodiment of the method according to the invention, allowing the determination of a rank.

This procedure for covering the vertices of the graph G with minors is described hereinbelow with reference to FIG. 3.

Step 200 consists in initializing the various parameters used in the processing of the graph G.

The subsequent steps 210 to 240 correspond to an iterative process applied to the graph G.

Each iteration consists here in generating a graph $G_{i+1}$ on the basis of the current graph $G_i$ by deletion from the current graph $G_i$ of any vertex which belongs to the minor $M_{G_i}$ obtained by the application of the minor generation procedure to the graph $G_i$, and which complies with a predefined criterion relating to its neighborhood in this minor $M_i$. The iterative process ends when the current graph $G_i$ is empty.

Step 210 consists in determining whether the current graph $M_i$ is empty. If it is, the iterative process terminates and the method continues at step 250. If it is not, the subsequent steps 220 to 240 are executed, consisting in generating the graph $G_{i+1}$ on the basis of the current graph $G_i$.

Step 220 consists in applying the "minor" procedure to the graph $G_i$ to obtain the minor $M_{G_i}$.

Step 230 consists in deleting from the current graph $G_i$ any vertex v whose characteristic vector $$A_{M_{G_i}}(v)$$

of the neighborhood of the vertex v in the minor $M_{G_i}$ and the characteristic vector $A_{G_i}(v)$ of the neighborhoods of the vertex v in the graph $G_i$, satisfy the following relation:

$$|A_{M_{G_i}}(v)| \le \gamma |A_{G_i}(v)| \qquad (2)$$

where γ is a predefined real coefficient lying between 0 and 1, for example equal to 0.5.

Step 240 consists in incrementing the index i of the current minor, the current graph being the graph $G_{i+1}$.

Finally, for each minor $M_{G_i}$ obtained, one determines the subset of said set of documents corresponding to the vertices of this minor.

It may be noted that the series of minors $M_{G_j}$ does not produce a partition, in the mathematical sense, of the set of vertices of the graph G, but that the union of the sets of vertices of the minors $M_{G_i}$ is equal to the set of vertices of the graph G. Thus each vertex of G belongs to one or more minors. The subsequent steps 250 and 260 exploit this property.

Step 250 consists in determining for each vertex of the graph G the number of minors $M_{G_i}$ to which it belongs.

Step 260 consists in performing a ranking of said set of documents, the rank of one document being determined as a function of the number of minors that was determined for the vertex corresponding to said document. The lower this number of communities, the more characteristic of these communities and hence relevant as regards these communities is the associated document.

The result of the sorting in communities or the ranking is displayed on the screen of the device according to the invention. Said device preferably comprises a suitable user interface in order to enable the user to select one ou several documents which might be of interest for him and/or to display the content of these documents.

The method according to the invention affords a procedure for classifying web pages that is adapted so as to cause communities or subsets to appear within a set of pages.

The procedure set forth here constructs the various subsets on the basis of the topological properties of the graph representing the set of pages. It proceeds by deletion of vertices, rejecting the vertices that are judged not to be able to belong to a certain subgraph. It consumes little calculation power on account of low complexity and may therefore be applied to sets of documents of large size.

According to a preferred implementation, the steps of the method of classifying electronic documents, according to the invention, are determined by instructions of a computer program.

Here, "computer program" is understood to mean one or more computer programs forming a set (software), the purpose of which is the implementation of the invention when it is executed by an appropriate computing system.

The method according to the invention is then implemented when the aforesaid program is loaded into a computer incorporated, for example, into a user terminal connected to an Internet type network and equipped with Internet browser software, wherein the computer includes a processor and memory.

Accordingly, the subject of the invention is also such a computer program, especially in the form of software stored on an information medium. Such an information medium may consist of any entity or device capable of storing a program according to the invention.

For example, the medium in question may comprise a hardware storage means, such as a ROM, for example a CD ROM or a microelectronic circuit ROM, or else a magnetic recording means, for example a hard disk. As a variant, the information medium may be an integrated circuit in which the program is incorporated, the circuit being adapted to execute or to be used in the execution of the method in question.

Furthermore, the information medium may also be a transmissible immaterial medium, such as an electrical or optical signal conveyable via an electric or optical cable, by radio or by other means. A program according to the invention may in particular be downloaded on an Internet type network.

From a design point of view, a computer program according to the invention can use any programming language and be in the form of source code, object code, or code intermediate between source code and object code (e.g., a partially compiled form), or in any other desirable form for implementing a method according to the invention.

We claim:

1. A method of computerized sorting of a set of electronic documents of the type possibly containing hypertext links to other electronic documents, the method comprising:
   a) analyzing the set of electronic documents to detect presence of the hypertext links and to construct a graph representing said set of electronic documents, each vertex of the graph corresponding to one of the electronic documents of said set, and an edge between two vertices of the graph indicating the presence of at least one hypertext link between the two electronic documents corresponding to said two vertices;
   b) obtaining a minor $M_G$ of the graph G comprising a predefined maximum number N of vertices by deleting at least one vertex of the graph G to minimize a predefined distance between said graph G and said minor $M_G$ for said predefined number N of vertices by taking into account a neighborhood of all vertices of the graph G, said distance measuring perturbation of the neighborhood of the vertices of the graph G that is engendered by the generation of the minor $M_G$ of the graph; and c) determining a subset of said set of electronic documents which corresponds to the vertices of the minor $M_G$ of the graph.

2. The method as claimed in claim 1, wherein step b) includes a step of processing the graph G by an iterative process, each iteration comprising generating a minor $M_{i+1}$ of a current minor $M_i$ of the graph by deletion from the current minor $M_i$ of the graph of at least one vertex v satisfying a predefined criterion relating to a comparison of its neighborhood in the current minor $M_i$ of the graph and of its neighborhood in the constructed graph G, the iterative process ending when the number of vertices of the current minor $M_i$ of the graph becomes less than or equal to N.

3. The method as claimed in claim 2, wherein said criterion is satisfied for a given vertex v if a characteristic vector $A_{M_i}(v)$ of the neighborhood of the vertex v in the current minor $M_i$ of the graph and the characteristic vector $A_G(v)$ of the neighborhood of the vertex v in the constructed graph G, satisfy the following relation:

$$|A_{M_i}(v)| \leq \beta |A_g(v) - A_{M_i}(v)|$$

where $\beta$ is a convergence parameter.

4. The method as claimed in claim 3, further comprising:
adjusting a value of the convergence parameter $\beta$ to a predefined initial value $\beta_0$ before execution of the iterative process of step b);
readjusting the value of the convergence parameter $\beta$ after an iteration if this iteration has not culminated in modification of the current minor $M_i$ of the graph and if the predefined number N of vertices is not reached for the current minor $M_i$ of the graph; and
reinitializing the value of the convergence parameter $\beta$ to its initial value $\beta_0$ after an iteration has culminated in the modification of the current minor $M_i$ of the graph.

5. The method as claimed in claim 2, wherein said iterative process is applied to the graph G after execution of a step to delete from the graph G the vertices having a number of neighbors that is less than a predefined threshold $\alpha$.

6. The method as claimed in claim 1, wherein said predefined distance is a sum, over a graph of Hamming distances, of characteristic vectors of the neighborhood of the vertices which constitute the minor $M_G$ of the graph when said neighborhood is located in the graph G.

7. The method as claimed in claim 1, wherein said predefined distance is a sum of a difference of eigenvalues of Laplacians of the graph G and of the minor $M_G$ of the graph.

8. The method as claimed in claim 1, further comprising:
processing the graph G by a second iterative process, each iteration including generating a second graph $G_{i+1}$ based on a current graph $G_i$, by deletion from the current graph $G_i$ of any vertex which belongs to the minor $M_{G_i}$ the current graph, obtained by application of step b) to the current graph $G_i$, and which satisfies a second predefined criterion pertaining to its neighborhood in this minor $M_i$ of the graph, said second iterative process ending when the current graph $G_i$ is empty; and
determining, for each minor $M_{G_i}$, the current graph obtained, a subset of said set of documents corresponding to the vertices of the obtained minor $M_{G_i}$ of the current graph.

9. The method as claimed in claim 8, further comprising:
determining for each vertex the number of minor $M_{G_i}$ graphs to which each vertex belongs; and
performing a ranking of said set of documents, a rank of a document being determined as a function of a number of obtained minors $M_{G_i}$ of the current graph comprising the vertex corresponding to said document.

10. The method as claimed in claim 8, wherein said second predefined criterion is satisfied for a given vertex v if a characteristic vector $$A_{M_{G_i}}(V)$$

of the neighborhood of the vertex v in the minor $M_{G_i}$ the current graph and the characteristic vector $A_{G_i}(V)$ of neighborhoods of the vertex v in the current graph $G_i$ satisfy the following relation:

$$|A_{M_{G_i}}(V)| \leq \gamma |A_{G_i}(V)|$$

where $\gamma$ is a predefined real coefficient lying between 0 and 1.

11. A computer-readable medium encoded with a computer program that causes computerized sorting of a set of electronic documents of a type possibly containing hypertext links to other electronic documents, comprising:

a) program code for analyzing the set of electronic documents so as to detect presence of the hypertext links and to construct a graph representing said set of electronic documents, each vertex of the graph corresponding to one of the electronic documents of said set, and presence of an edge between two vertices of the graph indicating the presence of at least one hypertext link between the two electronic documents corresponding to said two vertices;

b) program code for obtaining a minor Mo of the graph G comprising a predefined maximum number N of vertices by deleting at least one vertex of the graph G to minimize a predefined distance between said graph G and said minor Mo for said predefined number N of vertices by taking into account a neighborhood of all vertices of the graph G, said distance measuring perturbation of the neighborhood of the vertices of the graph G that is engendered by the generation of the minor Mo of the graph; and c) program code for determining a subset of said set of electronic documents which corresponds to the vertices of the minor Mo of the graph.

12. A computing device for sorting a set of electronic documents of a type possibly containing hypertext links to other electronic documents, the device comprising:

a) means for analyzing the set of electronic documents to detect presence of the hypertext links and to construct a graph representing said set of electronic documents, each vertex of the graph corresponding to one of the electronic documents of said set, and an edge between two vertices of the graph indicating the presence of at least one hypertext link between the two electronic documents corresponding to said two vertices;

b) means for obtaining a minor $M_G$ of the graph G comprising a predefined maximum number N of vertices by deleting at least one vertex of the graph G to minimize a predefined distance between said graph G and said minor $M_G$ for said predefined number N of vertices by taking into account a neighborhood of all vertices of the graph G, said distance measuring perturbation of a neighborhood of the vertices of the graph G that is engendered by the generation of the minor $M_G$ of the graph; and c) means for determining a subset of said set of electronic documents which corresponds to the vertices of the minor $M_G$ output by said means for obtaining the minor $M_G$ of the graph G.

13. The device as claimed in claim 12, further comprising means for implementing the method for the computerized sorting of the set of electronic documents of the type possibly containing hypertext links to the other electronic documents.

* * * * *